May 23, 1961　　W. C. BURGESS, JR　　2,985,280
VIBRATORY CONVEYOR STRUCTURE
Filed May 13, 1958　　3 Sheets-Sheet 1
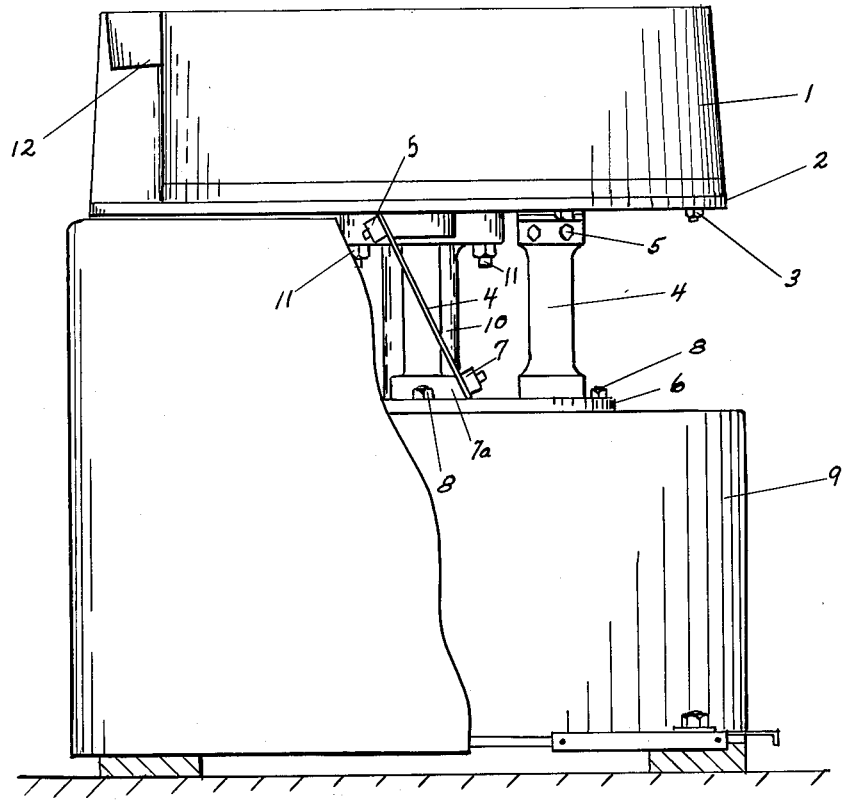
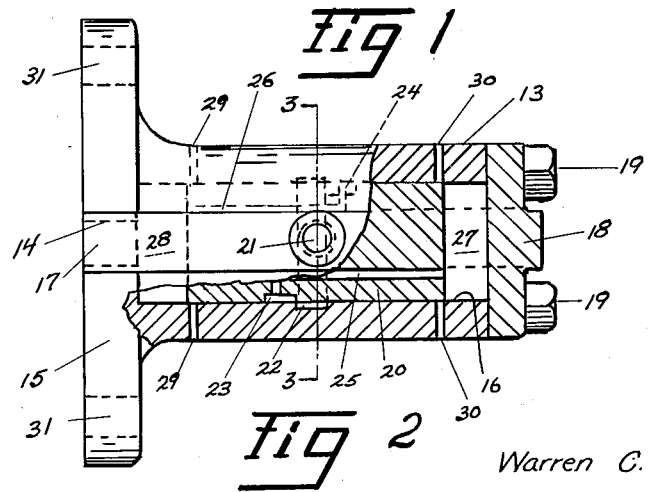
INVENTOR.
Warren C. Burgess, Jr.
BY
ATTORNEY May 23, 1961 W. C. BURGESS, JR 2,985,280
VIBRATORY CONVEYOR STRUCTURE Filed May 13, 1958 3 Sheets-Sheet 2

INVENTOR.
Warren C. Burgess, Jr.
BY Robert A. Sturges
ATTORNEY

May 23, 1961  W. C. BURGESS, JR  2,985,280
VIBRATORY CONVEYOR STRUCTURE

Filed May 13, 1958  3 Sheets-Sheet 3

INVENTOR.
Warren C. Burgess, Jr.
BY Robert A. Sturges
ATTORNEY

United States Patent Office 2,985,280
Patented May 23, 1961

2,985,280

VIBRATORY CONVEYOR STRUCTURE

Warren C. Burgess, Jr., 4972 Grace Road,
North Olmsted, Ohio

Filed May 13, 1958, Ser. No. 735,030

6 Claims. (Cl. 198—220)

This invention relates to devices for conveying materials over a horizontal or slightly inclined path by vibratory means, and more particularly to a novel support or spring for such devices. This invention also relates to a novel combination of such springs and a particular type of vibration-inducing device in such vibratory conveyors.

As conveniently constructed, vibratory conveyors, feeders, or screens, comprise a receptacle, a base, a spring system supporting the receptacle from the base and defining the path of reciprocation, and means for oscillating the receptacle along a confined path. The usual spring system comprises a series of rectangular or flat springs, and the usual vibration-inducing device is an electrically driven eccentric or an electromagnetic drive. The limitations of an electrical source of energy as to frequency are thereby imposed on the device, and the springs must be designed to have a natural frequency compatible with the energy source. The problem is further compounded in that the weight of the receptacle, the mass and rigidity of the base, and particularly the mass and variability of the load all affect the natural frequency of the system. Such systems will work very satisfactorily provided the load demands imposed upon the system are kept within limits. Currently available industrial embodiments are able to deliver parts, articles, granular or bulk materials at linear feed rates of from 200 to about 350 inches per minute up an incline of 5%. This is considered a maximum. In many industrial applications, this rate is too slow and resort must be had to other forms of feeding, e.g., gravity, necessitating buildings to accommodate.

There is, therefore, a definite energy level limit at or near natural frequency in flat spring devices beyond which one cannot operate without encountering early spring failure.

It has now been found that by altering the design of the flat spring in the manner hereinafter more fully explained enables the imposition of higher energy level operation upon currently available devices without encountering early spring failure.

It has also been found that the aforesaid delivery rates considered by the industry to be a maximum can be at least doubled in vibratory conveyor devices utilizing the combination of a pneumatic, free-piston vibration-inducing device and flat springs modified in accordance with this invention, thereby greatly enlarging the field of industrial application of vibratory conveying, feeding, or screening devices.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Broadly stated, therefore, this invention comprises in a vibratory conveyor, means for resiliently supporting a conveyor receptacle from a base including an elongated flat spring adapted to be secured at its opposite ends, said elongated flat spring having a planular width progressively decreasing from adjacent each of its opposite extremities to a lesser width intermediate the ends and means co-acting therewith to reciprocate said conveyor receptacle along a confined path. More particularly, this invention comprises in a vibratory conveyor, means for resiliently supporting a conveyor receptacle from a base and guiding said receptacle along a confined path including an elongated flat spring adapted to be secured at its opposite ends, said elongated flat spring having a planar width progressively decreasing from adjacent each of its opposite extremities to a lesser width intermediate the extremities, and a pneumatic, free-piston vibration-inducing device adapted to reciprocate said receptacle along said confined path.

In the annexed drawings,

Fig. 1 is a side view of a vibratory conveyor of the bowl feeder type constructed in accordance with this invention with part of the housing cut away to reveal the mounting of the receptacle on the springs and the mounting of the vibration-inducing device on the receptacle.

Fig. 2 is a partial cross-sectional view of a pneumatic, free-piston vibration-inducing device useful in accordance with this invention.

Figure 3:
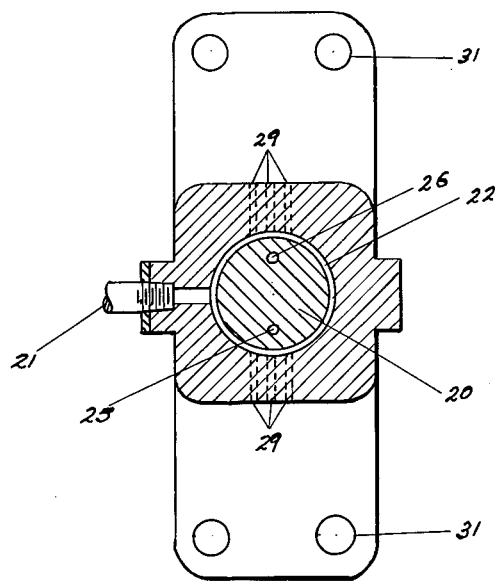
Fig. 3 is a cross-sectional view of the pneumatic, free-piston vibration-inducing device of Fig. 2 taken on the line 3—3.
Figure 4:
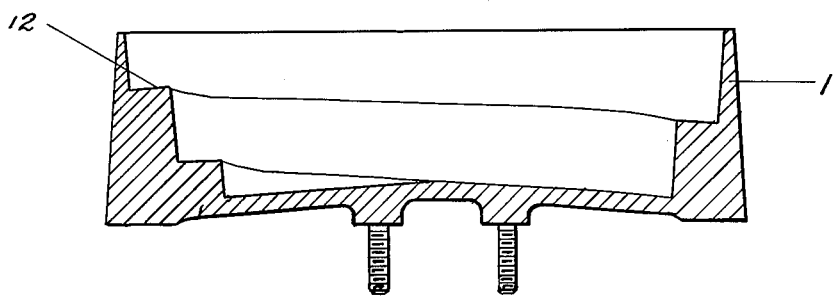
Fig. 4 is a cross-sectional view of a bowl type receptacle.

It should be noted at this point that the receptacle may have any convenient configuration, and may thus be an elongated straight trough, tube, or a bowl having a spiral inclined path which recedes from, and/or approaches, the center of the bowl as it proceeds around the annular wall and approaches the rim, or a helical path having a constant distance from the axis of the cylindrical tube defining the annular wall, or any combination of these. The path may be perforated in part or all of its concourse as in a vibratory screen. It is convenient to discuss this invention, however, with reference to but one form of such vibratory conveyor, i.e., the bowl type feeder, it being understood that the principles of the invention may be embodied as well in the other forms of vibratory conveyors, feeders or screens familiar to the art.

Referring more particularly to Fig. 1, there is shown as the receptacle, a feeder bowl 1. The feeder bowl 1 may be cast or fabricated from any convenient material, one such material being a polyester reinforced with glass fibers, another being steel. The feeder bowl 1 is conveniently affixed to a plate 2, such as by bolt 3. The plate 2 is supported upon a plurality of modified flat springs 4, two of which are shown in Fig. 1, each of those shown having an opposite counter part not shown, making a total of four modified flat springs. This number is merely exemplary, and may be more or less. The springs 4 are conveniently clamped to the plate 2 as by bolt means 5, and the other end thereof to a base plate 6 as by bolt means through clamp 7—7a. The plate 6 is, in turn, conveniently bolted as by bolts 8, to a massive base 9.

Also shown in Fig. 1 is a pneumatic, free-piston vibration-inducing device 10 mounted axially of the bowl 1 and conveniently bolted to the bowl 1 through the base plate 2 as by bolts 11.

As indicated above, there are four modified single member flat springs 4 spaced 90° apart and equidistant from the axis of the bowl 1. The springs 4 are angularly disposed at about 60° inclination to the base 6, although any angular disposition between about 15° and about 80° may be used. The purpose of the angular and circular disposition is to provide that the effect of the spring members is not only to return the bowl upwardly after being lowered, but also to exert a torque in a direction to throw the material counterclockwise (in the example shown in Fig. 1) along the ramp to the exit 12 of the bowl 1. Reversal of the direction of inclination of the springs will reverse the direction of flow. The confined path of vibration or reciprocation in this embodiment is curved and inclined, and may have a length varying from about .01" to .5" in larger devices depending on the desired feed rate. In elongated trough or tube conveyors, or screens, the angular disposition to the base may be of the same magnitude, 15°–80°, as above, but the springs are otherwise aligned in 1, 2, or more rows.

A vibration-inducing device of the pneumatic, free-piston type is best shown in Figs. 2 and 3.

Referring more particularly to Figs. 2 and 3, there is provided a vibrator casing 13 having a central circular bore 16 therethrough. The casing 13 is provided with a hole 14 which is drilled through the vibrator's sub-base 15 in order to properly machine the inner chamber 16 of the casing 13. The hole 14, upon completion of the machining operation, is filled by inserting therein core plug 17 which provides an air-tight seal. The opposite end of the casing 13 is likewise made air-tight by any suitable means, such as, a head 18 firmly held in position on the casing 13 by bolts 19.

Mounted within the central circular bore 16 is a cylindrical free-piston 20, the outer surface of which is in sliding contact with the machined inside surface of the cylindrical bore 16. The free-piston 20 is mounted so as to provide for reciprocal movement in an axial direction within the casing 13.

The casing 13 is further provided with an inlet port indicated at 21 to permit the introduction of gas under pressure into the system. This inlet port 21 may be provided with a conventional inlet one-way shut off valve, or any other conventional inlet valve to regulate the flow of gas to the system. This has not been shown in Figs. 2 and 3. Such inlet port 21 leads to a circularly grooved chamber 22 disposed between the piston 20 and the casing 13 and by means of which the gas under pressure is directed alternately into recesses, or ports, 23 and 24 in the piston 20, which, in turn, carries the gas under pressure through ducts 25 and 26, respectively, to the end chambers 27 and 28, respectively, of the casing 13. Thus, as the piston 20 is driven in a reciprocating manner, the gas under pressure will alternately be directed to end chambers 27 and 28 of the casing 13. Following the introduction of the gas under pressure into end chamber 27, the gas is subsequently released to the atmosphere through exhaust ports 30. Similarly, following the introduction of the gas under pressure into end chamber 28, the gas is released to the atmosphere through exhaust ports 29.

Suitable holes 31 are provided in the base 15 of the casing 13 for securing the vibration-inducing device to the base of the bowl 1.

For an amplified disclosure of the design of this preferred form and other preferred pneumatically operated free-piston vibration-inducing devices for use in accordance with this invention, reference may be had to my co-pending application Serial No. 641,326, filed February 20, 1957, now Patent Number 2,861,548, dated November 25, 1958. Other gas operated free-piston devices not operating against substantial compression of the supply gas may be used, particularly at lower energy levels.

The manner of operation of the pneumatic free-piston vibration-inducing device useful in this invention may be briefly described as follows: Gas under pressure, for example, compressed air under 10 to 100 p.s.i.g. is introduced to the system through the inlet port 21 which leads to the circular chamber 22. When the free-piston 20 is slightly to the left of that illustrated in Fig. 2, circular chamber 22 is in contact with the opening of duct 24. Thus, the gas under pressure flows through duct 24 into end chamber 28, where such gas under pressure tends to force the free-piston 20 to the right. As the free-piston moves to the right, contact is established between circular chamber 22 and duct 23, and contact between circular chamber 22 and duct 24 is eliminated. Thus, gas under pressure commences flowing through duct 24 into end chamber 27, tending to decelerate the movement of free-piston 20 to the right. However, the momentum of the free-piston 20 carries it beyond the point where full contact between circular chamber 22 and duct 23 is established. Thus, the gas present in the end chamber 27 is substantially sealed in that end chamber, causing the pressure therein to build up greatly as the free-piston 20 continues to move to the right. Such increased pressure decelerates the movement of the piston to the right at an increased rate, stops it, and then accelerates the movement of the free piston to the left to complete the cycle. When the positioning of the ducts and exhaust ports is as taught in the aforementioned patent, there may be provided the proper degree of "end clearance" between the end of the free-piston 20 and the inner face of the head 18, for example, such that at cut-off, enough gas is present that a temporary cushion of gas may be formed so that the operation of the vibration-inducing device is substantially noiseless except for the escape of gas from the exhaust ports.

Also as mentioned in the aforementioned patent, the frequency of vibration or reciprocation of the free piston 20 can be varied over a considerable range by adjustment of the pressure of the gas fed to to inlet port 21. This feature frees the design of the flat spring members 4 from dependence upon the frequency of the electrical source of energy in electric motor driven or electromagnetically vibrated devices. Moreover, the power delivered by these pneumatic, free-piston vibration-inducing devices is sufficient to convey materials at the advance rates frequently demanded by industry, that is, in some cases, nearly 900 inches per minute.

These free-piston, pneumatic vibration inducing devices provide a continuous deceleration and acceleration of the moving piston as distinct from that in an impacting type of action. The power input in one direction is the same as the power input in the opposite direction. Moreover, the frequency can be varied in response to the gas pressure during operation. It is possible to operate at natural frequency and thus take advantage of the vast increase in performance at this point, which performance falls rapidly away as one departs a few cycles either way from natural frequency. The pneumatic free-piston devices hereof are capable of immediate tuning to the natural frequency of the system.

Standard rectangular flat springs are not able, however, experience has shown, to store and release energy at the levels demanded for the linear or curvilinear movement of materials at velocities of the magnitude above mentioned. A small increase in power applied at or near natural frequency of currently available springs will break such springs in a short time.

Figure 5:
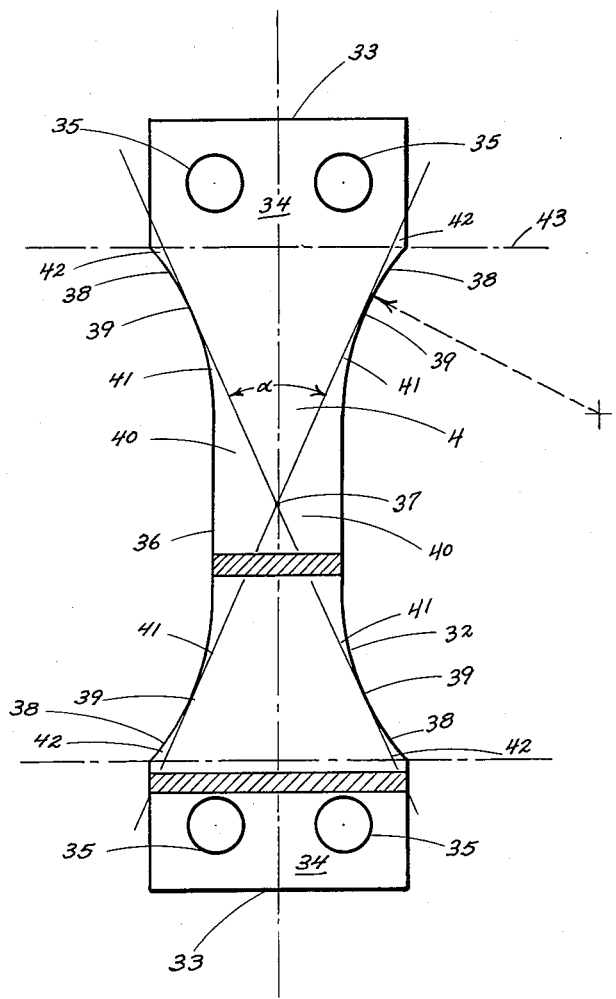
Fig. 5 is a planar view of a flat spring modified in accordance with this invention.

In Fig. 5, there is shown a plan view of a typical spring of the improved type useful in the devices of this invention and in many other applications where flat springs are ordinarily used. For example, flat springs of the type shown in Fig. 5 may be used to replace the multiple leaf type springs such as used to suspend the rear axle assembly in automotive vehicles.

It will be observed that there is shown in Fig. 5 a flat spring member adapted to be retained at each end, the planar width of said spring member progressively decreasing from adjacent the extremities to a lesser width intermediate the extremities. The effect of this "necking down" of the flat spring is believed to be to remove the line of concentrated stress from the point where the spring exits from the clamp, or other retaining means, and to distribute it over an area at a magnitude of stress which is well below that which will cause rapid fatiguing of the metal, as will appear hereinafter. In designing of these springs, the physical size necessary to provide the desired natural frequency at a given amplitude of vibration for the system may be determined using standard flat or rectangular spring practice. It then becomes a primary objective to provide a cross-section such that the maximum stress, $s_{max}$, approaches a constant along the beam. A number of methods have been suggested for doing this, all yielding some improvement, but failing under advanced power and frequency conditions to give indefinite service. A series of tests were conducted using the same receptacle, base, and pneumatic, free-piston vibration inducer driving at a higher than usual energy level and at or very close to natural frequency, but with various springs embodying the several suggested methods. Like conditions of frequency and energy level were used.

A rectangular spring broke rather consistently at from 200,000–300,000 cycles. A laminated leaf type spring with gaskets separating thin leaves broke at about 350,000–365,000 cycles. These two types break at a point of concentrated stress, i.e., where the spring emerges from the clamp. A multiple leaf type built up of leaves of different lengths superimposed upon one another at each of the ends gives a spring of generally X shape as viewed from the side. Such springs broke at about 365,000 cycles, and the breaks occurred at different leaf ends.

Another type of relief mechanism has been tried wherein the clamps are re-designed to provide a constant stress curvature restraint or throat, as a means of relieving concentrated stress. Such springs broke at approximately 365,000 cycles.

In synchronous vibrating machinery operating at natural or harmonic frequency with multiple, variable length, leaf springs, it has been found that the stresses are such that the finite multiple points of leaf terminations result in fatigue breakage, usually within 500,000 cycles, which is a relatively short period of operation. This could be improved with better spring metal, but ultimate breakage is not avoided.

When the springs are designed with a constant thickness and variable width, an example of which is shown in Fig. 5, the endurance limit of about 6,000,000 cycles is surpassed and indefinite life from that point on achieved. When failure did occur with such springs, several causes were noted, namely, mechanical failure due to flaws in the metal, rust, accidental nicks, etc. and marginal design. Most surprising was the fact that springs of the new design made from cold rolled steel instead of alloy spring steel outlived the best rectangular alloy steel springs available under similar testing conditions.

Obviously, a plurality of the new springs used in this invention and of equal length may be laminated or placed together to provide a composite spring member useful in accordance herewith and without substantially altering the manner in which the modified spring operates.

The principle involved in the new spring design is that of a beam of variable cross-section. In such a beam, the section modulus varies at each point along the beam in the same proportion as the bending moment. In this manner, the maximum stress is equal to the bending moment, M, divided by the section modulus Z, is equal to a constant, i.e., $$s_{max} = \frac{M}{Z} = \text{a constant}$$

Each cross-sectional segment needs only the area necessary to satisfy the conditions of strength required by the physical dimensions of the device to be supported, e.g., a feeder bowl 1.

The achievement of $s_{max}$ as a constant can be done in several ways. For example, the thickness can be machined to follow a parabolic law, or the width of the spring can be machined to follow a linear relationship, as evidenced by the equation:

$$s = \frac{Mc}{I} = \frac{\frac{Phx}{2}}{\frac{bh^3}{12}} = \frac{6Px}{bh^2}$$

where $h$ is the thickness, $b$ is the width, P is the load and $x$ is a parametric length, or distance out where M is being measured.

A typical example of the usual approximation of the linear law is that found in a conventional multi-leaf auto spring. Machining to conformity with a parabolic law is presently too expensive and difficult to employ, particularly with a simpler method now available.

Referring more particularly to Fig. 5, there is here shown a plan view, with cross-sections, of an elongated flat spring member 4 modified in accordance herewith. The spring member 4 shown was made from a rectangular piece of cold rolled steel 2" x 6" x 5/32". Cut-outs 32 to a suitable depth, e.g., 0.5 inch, were made in each side with a 2" radius milling cutter, the cut commencing and terminating 1" from the respective ends 33 to form a clamping face 34 adjacent each extremity. Suitable bolt eyes 35 in this case 7/16" diameter, may be provided. The central section 36 is maintained at a suitable width in the example shown, 1".

Spring members 4, one of which is shown in Fig. 5, and having dimensions and material as given above and assuming, of course, freedom from flaws, nicks, rust, etc., have outlasted corresponding standard rectangular spring members 2" x 6" x 5/32" made of hi-carbon spring steel and under similar mounting and testing conditions of advanced power requirements, by at least 6–7,000,000 cycles.

In designing these springs, rectangular spring practice may be used as a guide to select a suitable width of the central portion 36. To secure a desired approximation of the natural frequency, the thickness can be varied. For example, in the specific embodiment illustrated in Fig. 5, the thickness is 5/32". On a semi-rigid base, using four springs in the device illustrated in Fig. 1, the natural frequency of these springs was found to be 2250 under a bowl weight of 120 lbs. The bowl was 30" in diameter, and the free piston 1 5/8" diameter by 2 7/8" long weighing 1 lb.-4 ounces. An "X" may be drawn having its apex at the planar center of the proposed spring as indicated in Fig. 5 and defining an angle $\alpha$. This angle has been found to be directly proportional to the maximum stress, $s_{max}$. The angle $\alpha$ in the specific embodiment illustrated in Fig. 5 is approximately 49° which is suitable for most uses. Experience has indicated that angles less than about 30° are too small. The extremities of the X intersect the sides of a conveniently wider piece of spring material at a point which will be covered by the intended clamp, or which is beyond (using the center as a reference point) the lines at either end at which flexure ceases. A clamp is illustrated in Fig. 1. The combination of 7 and 7a defines a clamp. Where the spring member 4 emerges from the clamp 7—7a is a line of concentrated stress where flexure ceases, corresponding to the line 43 in Fig. 5. Now from the lines of emergence 43 from the clamp there are described convenient curved lines 38 at each end from the intersection of the clamp emergence line 43 tangent to the corresponding X line, at 39, and terminating at the narrower predetermined width of the central portion 36. These curved lines 38 can follow any contour, e.g., parabolic and hyperbolic, if desired, but it is most convenient to utilize the arc of a circle.

The latter design enables the use of a milling cutter to fabricate the cut-out portion. There has thus been provided a method of controlling the degree of stress concentration in the region of maximum stress to a working value.

The area of stress concentration in the modified devices of this invention is spread out along the curved portion, the larger the radius, the larger the dispersion of the effects of stress concentration. Any suitable radius of cut, where arcuate curves are employed, e.g., 0.5 to 2, 3 or more times the normal width of the stock from which the spring is fashioned may be used. Barring flaws in the metal, and under conditions of reasonable handling to avoid nicks, rust, etc. cold-rolled steel springs so designed will normally out-last high-carbon alloy steel springs of rectangular configuration.

It should be noted that this method of controlling the degree of stress concentration may be achieved broadly by adjusting the width in the manner above indicated which is a preferred mode. Equivalent modes may be employed. While a spring of symmetrical configuration is shown in Fig. 5 and is preferred, adjustment of the width on only one side instead of two sides may also be made, i.e., as if the spring shown in Fig. 5 were cut in half along its vertical axis to form a spring of a symmetric planar outline.

From purely theoretical considerations, the planular outline intermediate the ends of a flat spring ideally meeting the condition of $s_{max}$ equalling a constant would be X shaped. Obviously, a beam of zero cross-sectional area at the apex has no structural strength and is unable to transmit a shearing force. It is believed, however, that by allowing the lateral or side V's of the theoretical X to be filled in so as to provide a width sufficient to transmit a shearing force, and additionally breaking critical sharp corners with curved fillets, a substantial and useful portion of the advantages of the theoretically perfect design are secured without introducing extraneous factors which in the prior modifications have caused trouble. The maximum stress, $s_{max}$, then approaches the ideal constant value along the flat spring.

In Fig. 5, therefore, the fillets 40 fill the lateral, or side V's of the theoretical X. These fillets 40 may be curved, or have a straight portion in them as shown in Fig. 5. The fillets 41 break the otherwise angular intersection of the tangent lines defining the angle alpha, and the extension of the straight lines defining the central section 36. The fillets 42 at the run-out of curves 38 occur by reason of the milling operation which is the practical and best way known to me for making these modified springs. The spring should be clamped along a line passing through fillets 42 as the width is desirably and advantageously greater here than the width of the theoretical X. A two inch radius cutter was used in making the spring shown in Fig. 5. However, a cutter of larger radius, for example, 4", 6", or more; or a cutter of smaller radius, e.g., 1" or less could have been used, or complex curves other than arcuate could have been made.

Spring members 4, such as above described, are provided in the device shown in Fig. 1.

When a bowl feeder is constructed as herein described with a bowl, a pneumatic, free-piston vibration-inducing device, and flat springs of the special design, there is obtained a vibratory bowl type parts feeder having numerous advantages over prior devices. The feeder will not choke out upon suddenly dumping into the bowl a new supply of parts. The springs can operate on a much expanded range of power requirements without failure. The pneumatic, free-piston vibration-inducing device in combination with the novel springs enables operation under advanced power input and enables the device to sustain variation in loading conditions caused by suddenly refilling the bowl without cessation of feeding. Moreover, early and consistent spring failure experienced with a similar device, i.e., a bowl, the pneumatic, free-piston vibration-inducing device, and the usual rectangular springs, at 500,000 cycles, or a few hours of operation, is not encountered in the improved device. It appears that the higher energy capacity of the pneumatic, free-piston vibration-inducing device at natural frequency cannot long be tolerated without modification of the spring design in a manner such as herein provided.

When the new springs are employed, and when the new combination of these springs with the pneumatic, free-piston vibration-inducing devices is employed, these respective advantages are also secured with other types of vibratory conveyors such as the elongated trough, or tube, a helical conveyor, vibratory screens, and conveyors which combine the elongated trough, the screen, the spiral conveyor track and the helical conveyor track in a single receptacle. The confined paths of vibration or reciprocation may be somewhat different in the various devices contemplated, but there is no apparent difference in the manner of operation of the individual improved springs, and the mode of co-action of the pneumatic, free-piston vibration-inducing device with these novel springs.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a vibratory conveyor, means for resiliently supporting a conveyor receptacle from a base and guiding said receptacle along a confined path including an elongated flat spring adapted to be secured at its opposite ends, said elongated flat spring having a planar width progressively decreasing from adjacent each of its opposite extremities to a lesser width intermediate the extremities, and a pneumatic, free-piston vibration-inducing device adapted to reciprocate said receptacle along said confined path.

2. In a vibratory conveyor comprising a receptacle having a bottom with an upstanding wall, the improvement which comprises the combination of (a) means for resiliently supporting said receptacle from a base and guiding said receptacle along a confined path including an elongated flat spring adapted to be secured at its opposite ends, said elongated flat spring having a planar width progressively decreasing from adjacent each of its opposite extremities to a lesser width intermediate the extremities, and (b) a pneumatic, free-piston vibration-inducing device adapted to co-act with said receptacle when energized and reciprocate the same along said confined path.

3. In a vibratory conveyor comprising a receptacle having a bottom with an upstanding wall, the improvement which comprises the combination of (a) means for resiliently supporting said receptacle from a base and guiding said receptacle along a confined path including a plurality of elongated flat springs, each of which is secured at its opposite ends to said receptacle and said base, respectively, and each of said elongated flat springs having a planar width progressively decreasing from adjacent each of its opposite extremities to a lesser width intermediate the extremities, and (b) a pneumatic, free-piston vibration-inducing device adapted to co-act with said receptacle when energized and reciprocate the same along said confined path.

4. In a vibratory bowl feeder comprising a bowl having a bottom, an upstanding annular wall, and an inclined spiral conveyor track extending from the bottom upwardly around said annular wall, said track progressively receding from the center of the bottom of said bowl as the spiral conveyor track approaches the rim of said bowl, the improvement which comprises the combination of (a) means for supporting said bowl from a base and guiding said bowl along an inclined arcuate path of movement about the axis of said bowl including an elongated flat spring adapted to be secured at its opposite ends, said elongated flat spring having a planar width progressively decreasing from adjacent each of its opposite extremities to a lesser width intermediate the extremities and (b) a pneumatic, free-piston vibration-inducing device mounted axially of said bowl and adapted to co-act with said bowl when energized and reciprocate the same along said confined arcuate path.

5. In a vibratory bowl feeder comprising a bowl having a bottom, an upstanding annular wall, and an inclined spiral conveyor track extending from the bottom upwardly around said annular wall, said track progressively receding from the center of the bottom of said bowl as the spiral conveyor track approaches the rim of said bowl, the improvement which comprises the combination of (a) means including a plurality of elongated flat springs mounted from the ends and disposed about a common axis to support said bowl from a base and to guide said bowl along an inclined arcuate path of movement about its axis, each of said flat springs having a planar width progressively decreasing from adjacent each of its opposite extremities to a lesser width intermediate the extremities, and (b) a pneumatic, free-piston vibration-inducing device mounted axially of said bowl and adapted to co-act with said bowl when energized and reciprocate the same along said confined arcuate path.

6. In a vibratory bowl feeder comprising a bowl having a bottom, an upstanding annular wall, and an inclined spiral conveyor track extending from the bottom upwardly around said annular wall, said track progressively receding from the center of the bottom of said bowl as the said spiral conveyor track approaches the rim of said bowl, the improvement which comprises the combination of (a) a plurality of elongated flat springs mounted from the ends to said bowl and a base respectively, and disposed about the axis of said bowl and at an angle to the plane of said base to support said bowl from said base and to guide said bowl along an inclined arcuate path of movement about its axis, each of said elongated flat springs having a symmetrical configuration, the planar width of said spring progressively decreasing along a curved path from adjacent each of its opposite extremities to a lesser width intermediate its opposite extremities, and (b) a pneumatic, free-piston vibration-inducing device mounted axially of said bowl and adapted to co-act with said bowl when energized and reciprocate the same along said confined arcuate path.

References Cited in the file of this patent
UNITED STATES PATENTS

| | | |
|---|---|---|
| 1,810,882 | Heymann et al. | June 16, 1931 |
| 2,615,710 | Lyman | Oct. 28, 1952 |
| 2,744,748 | Wiegers et al. | May 8, 1956 |
| 2,758,704 | Spurlin | Aug. 14, 1956 |
| 2,876,891 | Long et al. | Mar. 10, 1959 |